(12) United States Patent
Chow

(10) Patent No.: US 8,800,056 B2
(45) Date of Patent: *Aug. 5, 2014

(54) GUIDED IMPLICIT AUTHENTICATION

(75) Inventor: Richard Chow, Sunnyvale, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 376 days.

This patent is subject to a terminal disclaimer.

(21) Appl. No.: 13/208,818

(22) Filed: Aug. 12, 2011

(65) Prior Publication Data

US 2013/0042327 A1    Feb. 14, 2013

(51) Int. Cl.
*H04L 29/06* (2006.01)
*G06F 21/31* (2013.01)
*G06F 21/10* (2013.01)

(52) U.S. Cl.
CPC .............. *G06F 21/316* (2013.01); *G06F 21/10* (2013.01); *H04L 63/10* (2013.01); *H04L 63/0892* (2013.01)
USPC ............ 726/28; 726/2; 726/3; 726/7; 726/17; 726/26; 726/27; 726/30; 705/64; 705/65; 705/66; 705/67; 709/217; 709/229

(58) Field of Classification Search
CPC ....... G06F 21/316; G06F 21/10; G06F 21/31; G06F 21/62; G06F 2221/2141; H04L 63/10; H04L 63/0892; H04L 67/306; H04L 67/22; H04L 63/102

USPC ............................................................ 726/28
See application file for complete search history.

(56) References Cited

U.S. PATENT DOCUMENTS 8,364,120 B2 *   1/2013   Kuhlman et al. ............. 455/411
2012/0060214 A1 *   3/2012   Nahari ............................ 726/19

OTHER PUBLICATIONS

Elaine Shi et al. "Implicit Authentication through Learning User Behavior." Proceedings of the 13th International Conference on Information Security, 2010, pp. 99-113.*

* cited by examiner

*Primary Examiner* — Taghi Arani
*Assistant Examiner* — Narciso Victoria
(74) *Attorney, Agent, or Firm* — Shun Yao; Park, Vaughan, Fleming & Dowler LLP

(57) ABSTRACT

Embodiments of the present disclosure provide a method and system for guided implicit authentication. The system first receives a request to access the controlled resource from a user. The system then determines whether the user request is inconsistent with regular user behavior by calculating a user behavior measure derived from historical contextual data of past user events. Next, the system allows the user to provide information associated with regular user behavior and/or current contextual data. The system further updates the user behavior measure based on current contextual data.

18 Claims, 5 Drawing Sheets

GUIDED IMPLICIT AUTHENTICATION

RELATED APPLICATIONS

The subject matter of this application is related to the subject matter in:
- co-pending non-provisional application by Bjorn Markus Jakobsson, Mark J. Grandcolas, Philippe J. P. Golle, Richard Chow, and Runting Shi entitled "IMPLICIT AUTHENTICATION," having Ser. No. 12/504,159 and filing date 16 Jul. 2009; and
- co-pending non-provisional application by Bjorn Markus Jakobsson, Richard Chow, and Runting Shi entitled "IMPROVED IMPLICIT AUTHENTICATION," having Ser. No. 12/955,825 and filing date 29 Nov. 2010, the disclosures of which are incorporated by reference herein.

BACKGROUND

1. Field

This disclosure is generally related to user authentication. More specifically, this disclosure is related to a method and system for implicitly authenticating a user to access a controlled resource based on contextual data indicating the user's behavior as well as the user's input.

2. Related Art

A mobile Internet device (MID) is a multimedia-capable handheld computer providing wireless Internet access. MIDs are designed to provide entertainment, information and location-based services for personal use. As the market for MIDs expands, mobile commerce (also known as M-commerce) is experiencing rapid growth. There is a trend toward hosting applications and services on the Internet. This results in increased demand for Internet authentication—whether of devices, computers or users. Moreover, the use of digital rights management (DRM) policies will likely increase the need for frequent authentications. Some of such authentications may happen simultaneously due to the increased use of mashups.

On the other hand, the shift toward greater market penetration of MIDs complicates password entry due to the limitations of MID input interfaces. Typing passwords on mobile devices, such as an iPhone™ or a BlackBerry™, can become a tedious and error-prone process.

Single sign-on (SSO) is an authentication mechanism to control the access of multiple, related, but independent software applications and services. With SSO, a user logs in once and gains access to all applications and services without being prompted to log in again for each of them. SSO addresses the problem of frequent authentications. However, SSO does not defend against theft and compromise of devices because it only vouches for the identity of the device, not its user.

SUMMARY

Embodiments of the present disclosure provide a method and system for guided implicit authentication. The system first receives a request to access the controlled resource from a user. The system then determines whether the user request is inconsistent with regular user behavior by calculating a user behavior measure derived from historical contextual data of past user events. Next, the system allow the user to provide information associated with regular user behavior and/or current contextual data. The system further updates the user behavior measure based on current contextual data.

In some embodiments, the system also prompts the user to confirm that current contextual data is safe for authentication in response to the determined inconsistency of the user request.

In some embodiments, the system also allows the user to input regular user behavior and expected behavior changes.

In some embodiments, the system calculates the user behavior measure by determining a scale indicating the likelihood of an event happening associated with the user in a given context.

In some embodiments, the system derives user behavior changes from user contextual data.

In some embodiments, the contextual data of the user comprise one or more of: location data, time data, calendar information, social network information, communication information, and online data.

In some embodiments, the system prompts the user to confirm that current contextual data is safe for authentication by requesting the confirmation from another device associated with the user.

In some embodiments, the system alerts the user through an email in response to the determined inconsistency of the user request.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide a method to lower error rates in implicit authentication. Implicit authentication allows a user to access a controlled resource based on contextual data indicating the user's behavior without the need to enter passwords or answer any authentication questions. In one embodiment, the contextual data comprises the environment that a user is in, and the activities that the user is engaged in. If the environment and the activities exhibit familiar patterns (for example, the user is detected to be in her office, or the user has just made a ten-minute phone call to her significant other), it is deemed safe to authenticate the user without prompting for a password or security question. On the other hand, if the detected environment and activities associated with the user exhibit anomalies or deviations from the user's normal behavior, the user is subjected to a more thorough inquiry, through different means, to determine whether or not it is safe to grant access, as the device may have been lost or stolen.

In some embodiments, by calculating the user behavior measure, the system determines that the user request to access a controlled resource is inconsistent with regular user behavior. The system then prompts the user to confirm that current contextual data is safe for authentication. Based on the user's confirmation, the system may adjust the user behavior measure accordingly. For example, the user is detected to be not at her home, but in a nearby park. A simple confirmation of a picnic gathering may be sufficient to safely authenticate the user without prompting for a password or security question. On the other hand, if the detected location is thousands of miles away, the system may send the confirmation request through other user devices.

Computing Environment

Figure 1:
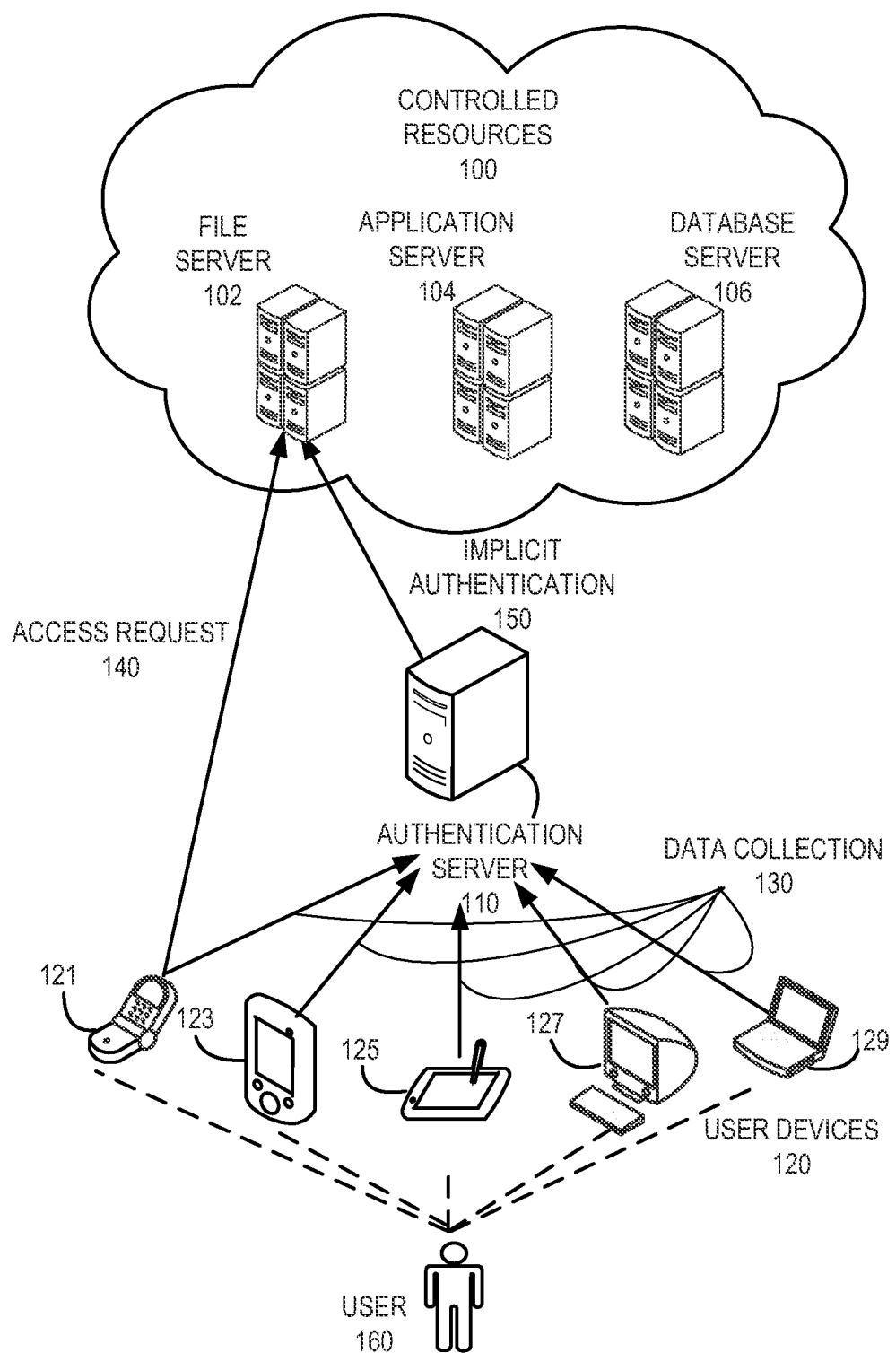
FIG. 1 presents a schematic illustrating a computing environment for guided implicit authentication in accordance with an embodiment of the present invention.

FIG. 1 shows a schematic of a computing environment for guided implicit authentication in accordance with an embodiment of the present invention. In this example, the computing environment includes controlled resources 100, an authentication server 110, a plurality of user devices 120 and a user 160. Controlled resources 100 can include any resource on a network, and a mechanism for providing access to such resources upon receiving requests from a user. For example, controlled resources 100 may include, but are not limited to, a file server 102, an application server 104, a database server 106, a mail server (not shown), etc. Authentication server 110 can be any type of computational device capable of performing an authorization or authentication operation of a user or a transaction. User devices 120 can generally include any node on a network including computational capability, a mechanism for communicating across the network, and a human interaction interface. This includes, but is not limited to, a smartphone device 121, a personal digital assistant (PDA) 123, a tablet PC 125, a workstation 127, a laptop 129, etc. Note that, although the present invention optimally is used with mobile Internet devices, it can be used with any type of computational device.

During operation, a user 160 sends a request 140 to access a network resource 100. Authentication server 110 collects contextual data about the user 160 from user devices 120 (operation 130), and presents implicit authentication information 150 to the access controller of controlled resources 100 to facilitate authentication of the user 160. In one embodiment, authentication server 110 collects contextual data about the user 160 after a controlled resource 100 receives the access request 140 from user devices 120. Authentication server 110 can collect contextual data from user devices 120 and periodically update a user behavior model about user 160.

Implicit Authentication

The following types of contextual data may be used to serve as indicators of a user's behavior: location; movements; actions; biometrics; other environmental data; co-location, including co-location with a wireless SSID, a mobile device, or a PC or laptop; recent authentication outcomes and scores; and application usage, such as web search queries or web browsing history; etc. Contextual data collected from one or more user devices may include multiple data streams, the combination of which provides a basis for the determination of the user behavior measure. Note that the term "data stream" refers to a stream of data of any type described herein.

This contextual data can be grouped into three classes based on the data sources used to make authentication decisions: device data, which are data primarily available on the device; carrier data, which are data available to the carrier; and third-party provider data, which are data available to other application and/or service providers. Note that a specific data type may belong to more than one class.

Many mobile devices are equipped with a Global Positioning System (GPS), and have wireless support, such as Wi-Fi and Bluetooth™. GPS data can be used to determine location and co-location. Also, multi-purpose devices have information about users' application usage, social membership information and user demographic data. In addition, there is contextual data, such as calendar entries, and web browser data containing sites visited. Another important piece of data relates to the success of local authentication attempts and local connection attempts, e.g., password entry and synchronization with already registered devices such as laptops and cars.

Contextual data can be represented in various ways. Some contextual data is taken in snapshot form; other contextual data is a continuous trace from the recent past. In some embodiments, data may be represented as a result of a Fourier transform. Data can also be rounded or approximated in different ways. For example, location data could correspond to representations meaning "at home," "at mall," "at work," etc. Data of several categories can be combined to create new data classes.

A user behavior model describes a user's behavior pattern by associating different data types together. In the above mobile phone example, e.g., a user behavior model can be conceptually built to indicate that there is a greater than 95% chance that the device is being used by its intended user when the user receives a phone call at home from his wife and talks for over an hour. As another example, a second user behavior model may indicate that it is quite likely that the device is with its intended user when the user calls his wife's phone number for five minutes from a known grocery store. By contrast, another user behavior model indicates that there is a less than 10% chance that the user is the owner of the mobile device when the user calls an unknown number in a fast-moving vehicle for over an hour.

The above-described user behavior models are merely one embodiment of many possible conceptual models. It is not intended to be exhaustive or to limit the present invention to the forms disclosed. The user behavior models described herein are for easy conceptual understanding. The actual design and storage of the user behavior models may vary in different systems.

In embodiments of the present invention, determination of implicit authentication for a user to access a controlled resource depends on a user's behavior measure. The user behavior measure takes into account the user behavior model, the request and recent contextual user behavior. When an event associated with a user device is observed, a rule is usually triggered to adjust the user behavior measure either up or down. For example, the system may determine a user behavior measure based on the user's calling records. An observed event could be an incoming call, an outgoing call, or initiation of a mobile application from the mobile phone, etc. In one embodiment, a rule includes a history string and an associated event.

The user behavior measure is adjusted based on whether the observed event is consistent with the user's ownership of the device. If so, the user's behavior measure is increased. On the other hand, if the observed user event is inconsistent with the user's ownership of the device, the user behavior measure is decreased. In one embodiment, if the user behavior measure is below a predetermined threshold value, an explicit authentication will be requested by the application or service the user is trying to access. The choice of which authentication method to use may depend on the user behavior measure. For example, the user may be asked to enter a password and to present a security token if the user behavior measure is too low. Alternatively, the user may be asked to enter a password if the user behavior measure is below the threshold value but not low enough to warrant presentation of the security token.

Guided Implicit Authentication

Embodiments of the present invention facilitate guided implicit authentications to increase the flexibility of the system, thereby lowering chances of unnecessary explicit authentication requests. In one embodiment, even if the system determines that the user request to access a controlled resource is inconsistent with the regular user behavior pattern after collecting and analyzing all the historical contextual data of the user from one or more user devices, the system prompts the user to confirm that current contextual data is safe for implicit authentication. Based on the user confirmation, the system can immediately update the behavior measure and memorize the current contextual data as a safe configuration for authentication. Without guidance, this safe configuration may take some time for the system to learn.

In some embodiments, the guide implicit authentication system provides a user interface for the user to input expected changes in user behavioral data. For example, the user interface allows the user to update contextual data in case a change in workplace or partner occurs. The user may also alert the system through the user interface before going on a trip, so that the location data may be less emphasized or ignored during the trip. Often, the user behavior measure is associated with the user's contact information, such as phone numbers or email addresses with which the user communicates. To improve the flexibility of the implicit authentication system, the user interface also allows users to update a list of reliable numbers and email addresses. Another example of contextual information is time, such as time of day and day of the week. The user interface can interact with the user's calendar closely to correlate time with the user's activities and schedules.

It is, therefore, very meaningful to combine user input and different types of contextual information. For example, if a user updates her schedule to indicate a forthcoming business trip to Mexico, the user's change of location to Mexico and future phone calls to/from Mexico become quite consistent. This is in contrast to the previous techniques that measure user behavior based only on extrapolations of user's past and present activities. The guided implicit authentication system provides a user interface for a user to update her behavioral data and confirm the safety of authentication, in addition to collecting different types of contextual data from one or more user devices. The user input can accelerate the learning process and reduce the error rate of the user behavior measuring mechanism deployed to automatically adjust the user behavior measure.

Figure 2:
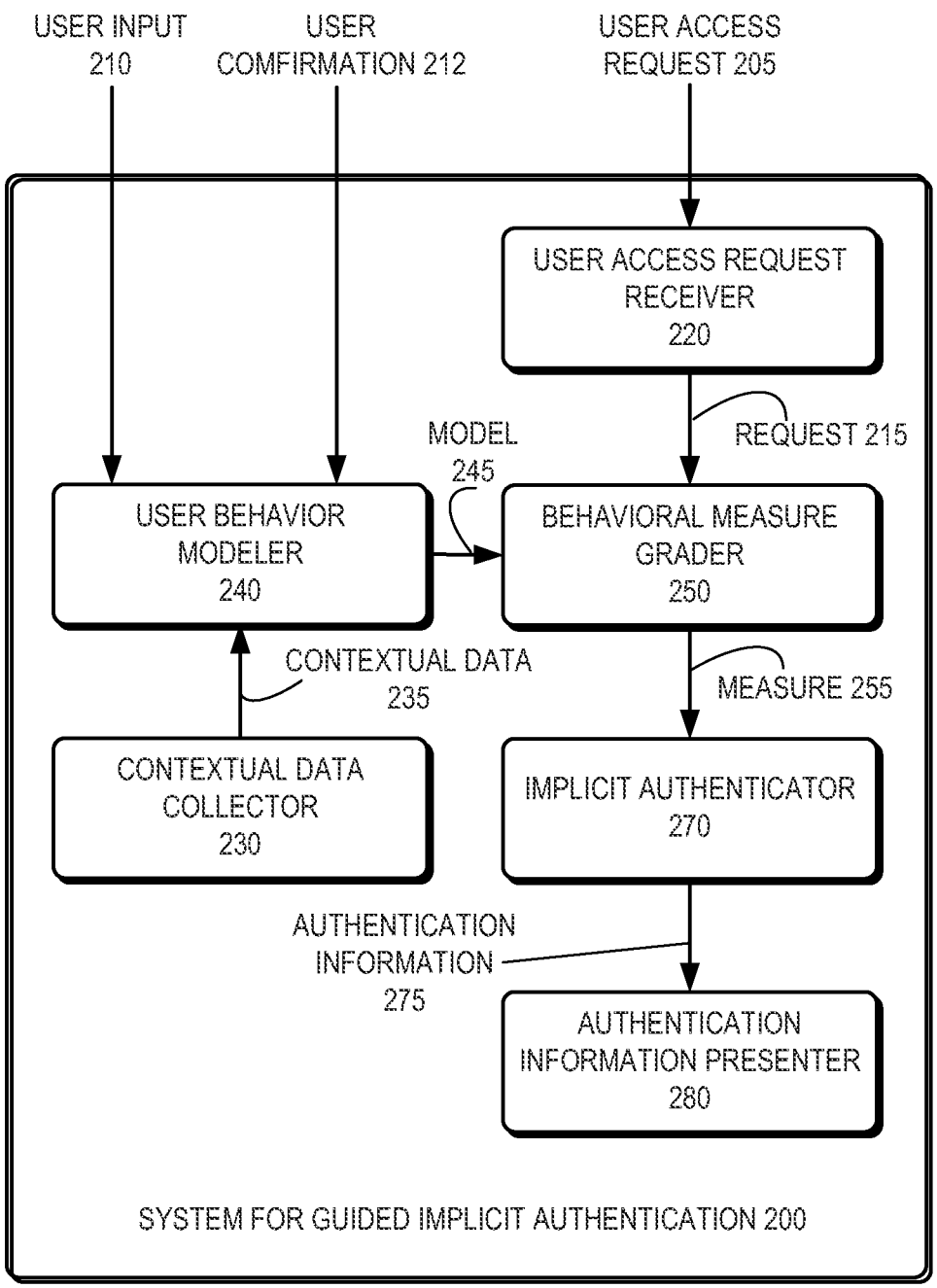
FIG. 2 presents a block diagram illustrating a system for guided implicit authentication in accordance with an embodiment of the present invention.

FIG. 2 shows a block diagram of a system 200 for guided implicit authentication in accordance with an embodiment. System 200 includes a user access request receiver 220, a behavioral measure grader 250, an implicit authenticator 270, and an authentication information presenter 280. System 200 additionally includes a contextual data collector 230 and a user behavior modeler 240. During operation, user access request receiver 220 receives user access request 205 from a user 160, analyzes the user access request 205, and forwards request 215 to the behavioral measure grader 250. Behavioral measure grader 250 receives forwarded user access request 215, and a user behavior model 245 from user behavior modeler 240. Behavioral measure grader 250 then calculates a user behavior measure 255 based on request 215 and user behavior model 245. User behavior measure 255 indicates the likelihood that user 160 who sends user access request 205 from a user device is the owner of the user device.

Contextual data collector 230 collects contextual data about user 160, which indicates a user's behavior or environment. Examples of contextual data 235 include locations, movements, actions, biometrics, authentication outcomes, application usage, web browser data (e.g., recently visited sites), etc. User behavior modeler 240 creates a user behavior model 245 describing a user's historical behavior pattern based on contextual data 235, user input 210, and/or user confirmation 212. User input 210 with respect to the user's general behaviors can be used to bootstrap user behavior modeler 240 at the beginning of the operation. User 160 may also input expected changes in his behavioral data to guide user behavior modeler 240. Responsive to a detected deviation from the user's regular behavior pattern, a user confirmation 212 confirms that current contextual data is safe for authentication, and the corresponding user behaviors are normal.

User behavior measure 255 can be represented by a history string corresponding to a sequence of observed events, a probability distribution corresponding to the likelihood of the observed events happening as a function of time, or a measure distribution corresponding to the change in user behavior measure 255 resulting from the observed events as a function of time. User behavior measure 255 is sent to implicit authenticator 270 to facilitate implicit authentication of the user. Implicit authenticator 270 calculates implicit authentication information 275 based on user behavioral measure 255. Implicit authentication information 275 is information that enables the access controller of controlled resources to make an authentication decision. Authentication information presenter 280 presents implicit authentication information 275 to the access controller of controlled resources.

Figure 3:
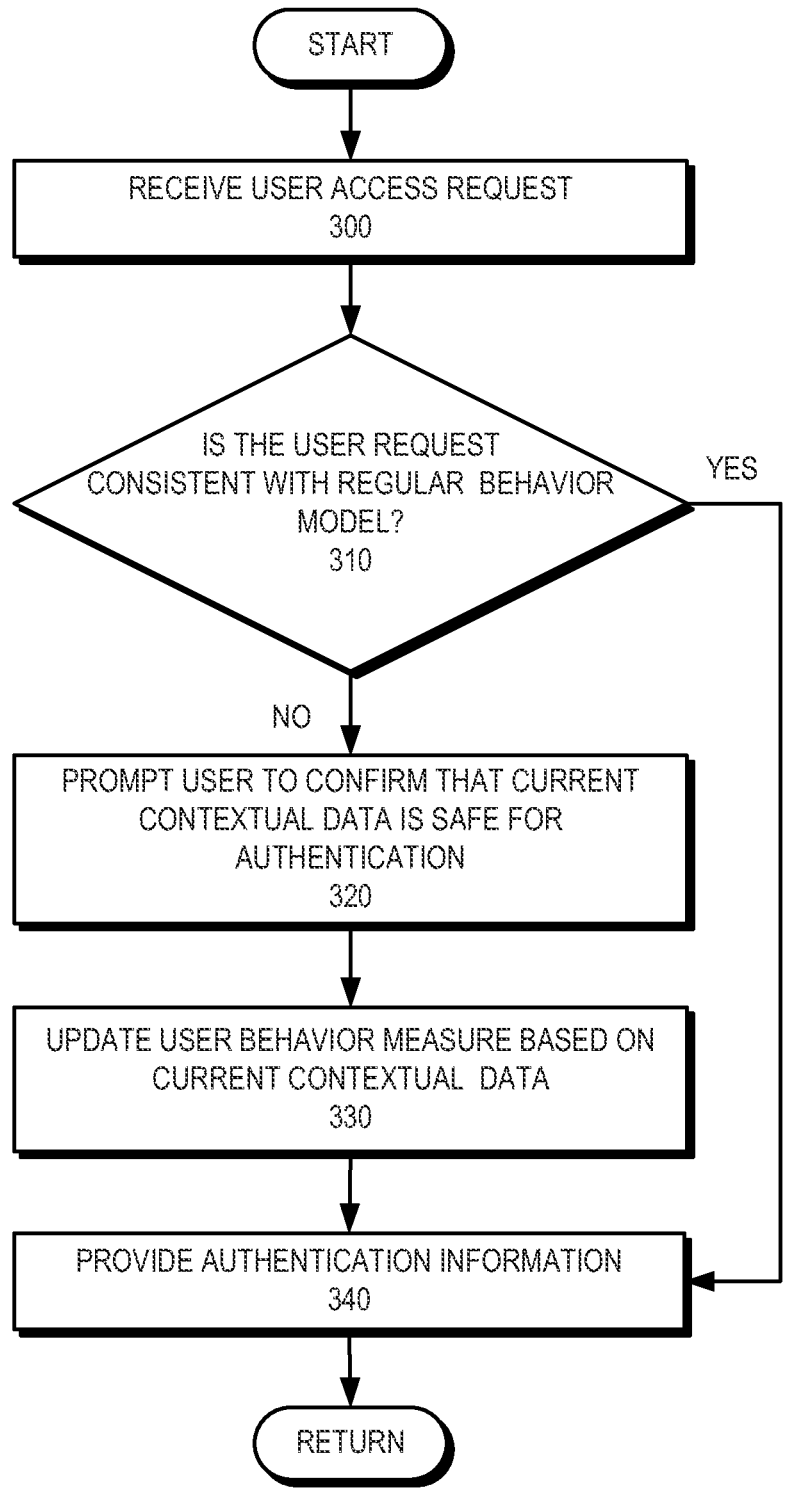
FIG. 3 presents a flow chart illustrating a method for guided implicit authentication in accordance with an embodiment of the present invention.

FIG. 3 shows a flow chart illustrating a method for guided implicit authentication in accordance with an embodiment. During operation, the system receives a user access request (operation 300). The user access request can contain login credentials for resource authentication. In other embodiments, the user access request can merely identify the resource to be accessed without providing any login credentials or authentication information.

The system then determines whether the user access request is consistent with a regular behavior model (operation 310) associated with the user who sends the access request. If so, the system provides authentication information (operation 340). Otherwise, the system prompts the user to confirm that current contextual data associated with the user is safe for authentication (operation 320). In response to the user's confirmation, the system updates the user behavioral measure based on current contextual data (operation 330). Finally, the system provides authentication information (operation 340). The implicit authentication information can be a binary authentication decision, or a confidence level.

Although in the example above, the user is asked to confirm that current contextual data associated with the user is safe for authentication after the user request is determined to be inconsistent with the regular behavior model, the user can also initiate input of behavioral data at the beginning of or during the operation. In other words, the user behavior measures may be generated and updated not only by the system automatically based on collected contextual data, but also by the user through user input.

Figure 4:
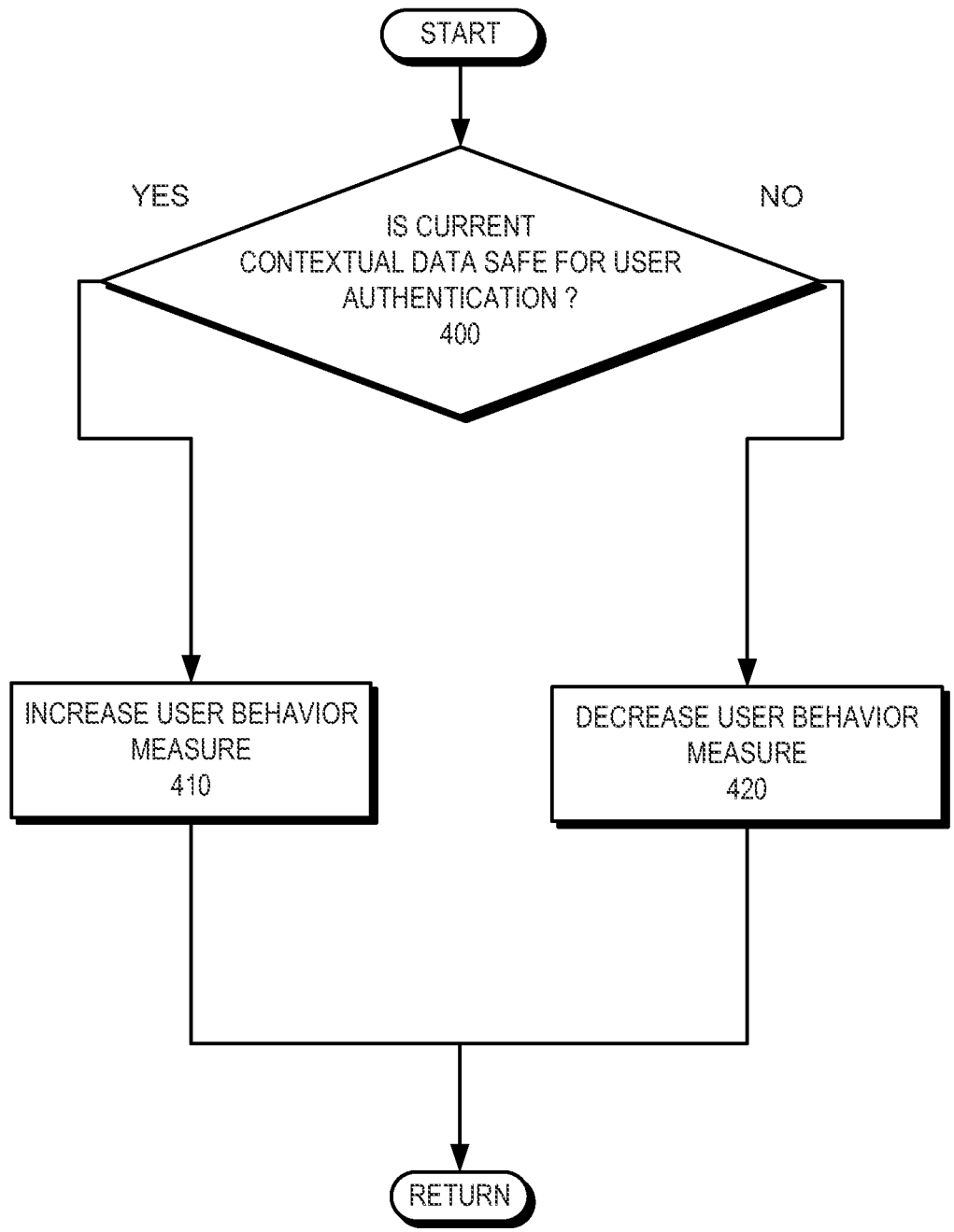
FIG. 4 presents a flow chart illustrating the process of adjusting a user behavior measure based on current contextual data in accordance with an embodiment of the present invention.

FIG. 4 presents a flow chart illustrating the process of adjusting a user behavior measure based on current contextual data in accordance with an embodiment of the present invention. The system starts by determining whether current contextual is safe for user authentication (operation 400). If the current contextual data is safe for user authentication, the user behavior measure is increased or adjusted up (operation 410). Otherwise, the user behavior measure is decreased or adjusted down (operation 420). For example, the system detects a user location a hundred and fifty miles away from a regular geographic area, which matches the address of the company headquarters to which the user has traveled. The user can either confirm that the new location is safe, or update his calendar to state the travel plan beforehand and let the system determine the safety of the new location automatically.

Apparatus for Implicit Authentication

Figure 5:
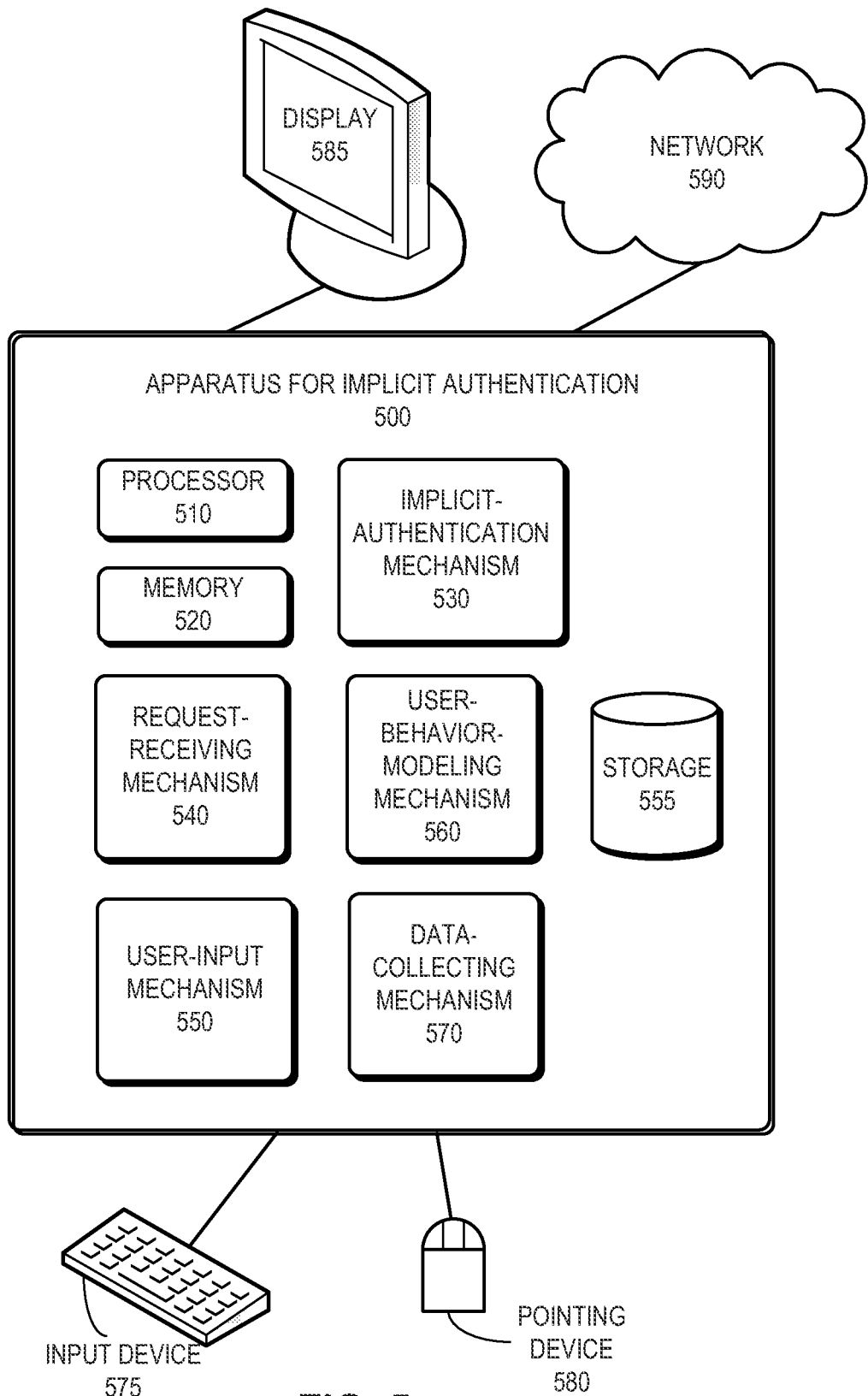
FIG. 5 presents a block diagram illustrating an apparatus for guided implicit authentication in accordance with an embodiment of the present invention.

FIG. 5 shows a block diagram illustrating an apparatus 500 for guided implicit authentication in accordance with an embodiment of the present invention. The apparatus 500 includes a processor 510, a memory 520, an implicit-authentication mechanism 530, a request-receiving mechanism 540, a user-input mechanism 550, a user-behavior-modeling mechanism 560, a data-collecting mechanism 570, and storage 555. The apparatus 500 can be coupled with an input device 575, a pointing device 580, a display 585, and a network 590.

The implicit-authentication mechanism 530 calculates the implicit authentication information based on the user behavior measure. The implicit-authentication mechanism 530 can be any computing component with a processing logic. The request-receiving mechanism 540 receives a user access request from a user. The request-receiving mechanism 540 can be a network port, a wireless receiver, a radio receiver, a media receiver, or any other receiving component without limitations.

The user-input mechanism 550 receives user behavioral data input or user confirmation. The user-input mechanism 550 can be any computing component with a user interface and a communication mechanism. The communication mechanism includes a mechanism for communicating through a cable network, a wireless network, a radio network, a digital media network, etc., without any limitations.

The user-behavior-modeling mechanism 560 creates a user behavior model based on the contextual data about a user collected by data-collecting mechanism 570, and/or user input from user-input mechanism 550. The user-behavior-modeling mechanism 560 can be any type of computing component with a computational mechanism.

The data-collecting mechanism 570 collects current contextual data about the user. The data-collecting mechanism 570 can be any device with a communication mechanism and can work with the storage 555. In some embodiments, the data-collecting mechanism 570 sends the collected recent contextual data to user-input mechanism 550. In other embodiments, the data-collecting mechanism 570 sends the contextual data to the user-behavior-modeling mechanism 560. The storage 555 can include, but is not limited to, a random access memory (RAM), flash memory, a magnetic storage system, an optical storage system, and magneto-optical storage devices.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present disclosure is defined by the appended claims.

What is claimed is:

1. A computer-implemented method for guided implicit authentication, the method comprising:
   receiving, by a computing device, a request to access a controlled resource from a user;
   determining current contextual data associated with the request;
   determining whether the current contextual data associated with the user request is inconsistent with regular user behavior by calculating a user behavior measure derived from historical contextual data of past user events;
   responsive to the current contextual data being inconsistent with regular user behavior, prompting the user to confirm whether the current contextual data is safe for implicit authentication;
   providing a user interface for the user to input regular user behavior and expected behavior changes;
   updating the user behavior measure based on the user input; and
   responsive to the user confirming that the current contextual data is safe for implicit authentication, updating the user behavior measure based on the current contextual data.

2. The method of claim 1, wherein calculating the user behavior measure comprises determining a scale indicating the likelihood of an event happening associated with the user in a given context.

3. The method of claim 1, further comprising:
   deriving user behavior changes from user contextual data.

4. The method of claim 1, wherein the contextual data of the user comprise one or more of: location data, time data, calendar information, social network information, communication information, and online data.

5. The method of claim 1, wherein prompting the user to confirm that current contextual data is safe for authentication further comprises requesting the confirmation from another device associated with the user.

6. The method of claim 1, further comprising:
   responsive to the determined inconsistency of the user request, alerting the user through an email.

7. A non-transitory computer-readable storage medium storing instructions that when executed by a computer cause the computer to perform a method for guided implicit authentication, the method comprising:

receiving a request to access a controlled resource from a user;

determining current contextual data associated with the request;

determining whether the current contextual data associated with the user request is inconsistent with regular user behavior by calculating a user behavior measure derived from historical contextual data of past user events;

responsive to the current contextual data being inconsistent with regular user behavior, prompting the user to confirm whether the current contextual data is safe for implicit authentication;

providing a user interface for the user to input regular user behavior and expected behavior changes;

updating the user behavior measure based on the user input; and responsive to the user confirming that the current contextual data is safe for implicit authentication, updating the user behavior measure based on current contextual data.

8. The non-transitory computer-readable storage medium of claim 7, wherein calculating the user behavior measure comprises determining a scale indicating the likelihood of an event happening associated with the user in a given context.

9. The non-transitory computer-readable storage medium of claim 7, wherein the method further comprises:

deriving user behavior changes from user contextual data.

10. The non-transitory computer-readable storage medium of claim 7, wherein the contextual data of the user comprise one or more of: location data, time data, calendar information, social network information, communication information, and online data.

11. The non-transitory computer-readable storage medium of claim 7, wherein prompting the user to confirm that current contextual data is safe for authentication further comprises requesting the confirmation from another device associated with the user.

12. The non-transitory computer-readable storage medium of claim 7, wherein the method further comprises:

responsive to the determined inconsistency of the user request, alerting the user through an email.

13. A system for guided implicit authentication, the system comprising:

an access request receiver configured to receive a request from a user to access a controlled resource;

a determination mechanism configured to determining current contextual data associated with the request, and to determine whether the current contextual data associated with the user request is inconsistent with regular user behavior by calculating a user behavior measure derived from historical contextual data of past user events;

a user interface configured to:

prompt the user to confirm whether the current contextual data is safe for implicit authentication, in response to the current contextual data being inconsistent with regular user behavior; and provide a user interface for the user to input regular user behavior and expected behavior changes; and an updating mechanism configured to:

update the user behavior measure based on current contextual data, in response to the user confirming that the current contextual data is safe for implicit authentication; and update the user behavior measure based on the user input.

14. The system of claim 13, wherein while calculating the user behavior measure, the determination mechanism is configured to determine a scale indicating the likelihood of an event happening associated with the user in a given context.

15. The system of claim 13, further comprising:

a derivation mechanism configured to derive user behavior changes from user contextual data.

16. The system of claim 13, wherein the contextual data of the user comprise one or more of: location data, time data, calendar information, social network information, communication information, and online data.

17. The system of claim 13, wherein while prompting the user to confirm that current contextual data is safe for authentication, the user interface is further configured to request the confirmation from another device associated with the user.

18. The system of claim 13, further comprising:

a warning mechanism configured to, responsive to the determined inconsistency of the user request, alert the user through an email.

* * * * *